US008769036B2

(12) United States Patent
Frey et al.

(10) Patent No.: US 8,769,036 B2
(45) Date of Patent: Jul. 1, 2014

(54) DIRECT SENDING AND ASYNCHRONOUS TRANSMISSION FOR RDMA SOFTWARE IMPLEMENTATIONS

(75) Inventors: Philip W. Frey, Rueschlikon (CH);
Bernard Metzler, Rueschlikon (CH);
Fredy D. Neeser, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 12/609,586

(22) Filed: Oct. 30, 2009

(65) Prior Publication Data

US 2011/0106905 A1    May 5, 2011

(51) Int. Cl.
*G06F 15/167* (2006.01)

(52) U.S. Cl.
USPC ........................................................ 709/212

(58) Field of Classification Search
USPC ........................... 709/212; 711/112, 150, 169
See application file for complete search history.

(56) References Cited

U.S. PATENT DOCUMENTS

| | | | | |
|---|---|---|---|---|
| 6,161,152 | A * | 12/2000 | Garg et al. | 710/46 |
| 7,635,987 | B1 * | 12/2009 | Agarwal | 326/39 |
| 7,647,436 | B1 * | 1/2010 | Westrelin et al. | 710/33 |
| 7,688,838 | B1 * | 3/2010 | Aloni et al. | 370/412 |
| 7,971,236 | B1 * | 6/2011 | Lentini | 726/6 |
| 8,122,155 | B1 * | 2/2012 | Marti | 709/250 |
| 8,131,814 | B1 * | 3/2012 | Schlansker et al. | 709/212 |
| 8,244,825 | B2 * | 8/2012 | Subramanian et al. | 709/212 |
| 8,249,072 | B2 * | 8/2012 | Sugumar et al. | 370/392 |
| 2005/0066046 | A1 * | 3/2005 | Chadalapaka | 709/230 |
| 2005/0129039 | A1 * | 6/2005 | Biran et al. | 370/412 |
| 2007/0226750 | A1 * | 9/2007 | Sharp et al. | 719/313 |

OTHER PUBLICATIONS

Interconnect Transport API (IT-API) Version 2.1, [online]; [retrieved on Oct. 27, 2009]; retrieved from the Internet http://www.opengroup.org/icsc/uploads/40/9143/IT-API-V2.1.pdf.
The Open Group, Interconnect Transport API, [online]; [retrieved on Oct. 27, 2009]; retrieved from the Internet http://www.opengroup.org/icsc/native/.
D. Dalessandro, A. Devulapalli, and S. Wyckoff, "iWARP protocol kernel space software implementation" in IEEE International Parallel and Distributed Processing Symposium (IPDPS). IEEE, 2006.
Lazy Asynchronous I/O for Event-Driven Servers, [online]; [retrieved on Oct. 28, 2009]; retrieved from the Internet http://www.usenix.org/event/usenix04/tech/general/full_papers/elmeleegy/elmeleegy.pdf.
OpenFabrics Alliance, [online]; [retrived on Oct. 27, 2009]; retrieved from the Internet http://www.openfabrics.org/.

(Continued)

*Primary Examiner* — Duyen Doan
(74) *Attorney, Agent, or Firm* — Cantor Colburn LLP; Daniel Morris

(57) ABSTRACT

Exemplary embodiments include RDMA methods and systems for sending application data to a computer memory destination in a direct but non-blocking fashion. The method can include posting a new work request for an RDMA connection or association, determining if there is a prior work request for the same connection or association enqueued for processing, in response to a determination that no prior work request is enqueued for processing, processing the new work request directly by sending RDMA frames containing application data referred to by the work request to the computer memory destination, performing direct sending while there is sufficient send space to process the new work request, and delegating the new work request to asynchronous transmission if a prior work request is already enqueued for processing or lack of send space would block a subsequent transmission operation.

20 Claims, 10 Drawing Sheets

(56) References Cited

OTHER PUBLICATIONS rddp—IETF Remote Direct Data Placement (rddp) WG, [online]; [retrieved on Oct. 28, 2009]; retrieved from the Internet https://www.ietf.org/mailman/listinfo/rddp.

RDMA Protocol Verbs Specification (Version 1.0), [online]; [retrived on Oct. 27, 2009]; retrieved from the Internet http://www.rdmaconsortium.org/home/draft-hilland-iwarp-verbs-v1.0-RDMAC.pdf.

A Remote Direct Memory Access Protocol Specification, [online]; [retrived on Oct. 27, 2009]; retrieved from the Internet http://tools.ietf org/pdf/rfc5040.pdf.

Direct Data Placement over Reliable Transports, [online]; [retrieved on Oct. 27, 2009]; retrieved from the Internet http://tools.ietf org/pdf/rfc5041.pdf.

Marker PDU Aligned Framing for TCP Specification, [online]; [retrieved on Oct. 27, 2009]; retrieved from the Internet http://tools.ietf.org/pdf/rfc5044.pdf.

The Open Group, RNIC Programming Interface Working Group, [online]; [retrieved on Oct. 27, 2009]; retrieved from the Internet http://www.opengroup.org/icsc/rnicpi/.

RNIC Programming Interface (RNICPI), [online]; [retrieved on Oct. 27, 2009]; retrieved from the Internet http://www.opengroup.org/icsc/uploads/40/8620/C054.pdf.

* cited by examiner

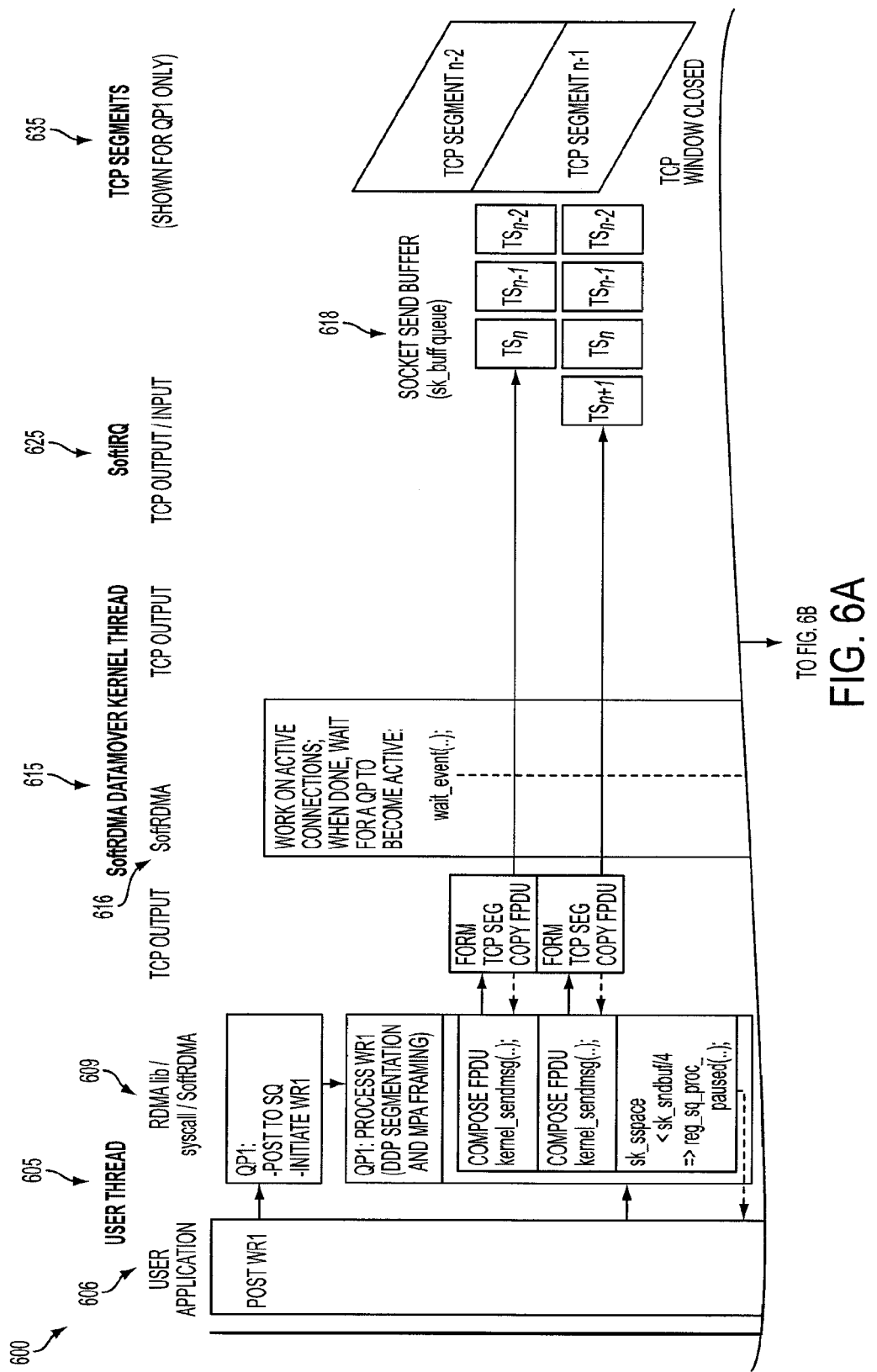

DIRECT SENDING AND ASYNCHRONOUS TRANSMISSION FOR RDMA SOFTWARE IMPLEMENTATIONS

BACKGROUND

The present invention relates to computer systems and remote direct memory access (RDMA), and more specifically, to methods and systems for direct sending of application data via a combination of synchronous and asynchronous processing.

RDMA device and application programming specifications state that posting work requests and dequeueing work completions should be "fast-path operations", which indicates that the corresponding function calls of a software implementation should be non-blocking. While "non-blocking" is not a precise characterization of a function, it generally means that the function may not sleep. This characterization implies that the function may not wait for (i) a used (or locked) resource to become freed (unlocked) by another thread, or (ii) a remote event, i.e., an event caused by a remote entity such as the transport layer peer or the network. In contrast, a "non-blocking" operation may perform a lengthy calculation as long as its execution time is approximately known, reasonably bounded and deterministic. Conversely, a "blocking" operation is one that may sleep.

An RDMA work request (WR) representing a data transfer operation provides a description of an application data buffer to be sent or received. For an RDMA device, posting a WR typically queues the WR to a FIFO send queue (SQ) or receive queue (RQ). For example, an RDMAP Send or RDMA Write WR may be posted to an SQ. Similarly, reaping a work completion dequeues a work completion from a completion queue (CQ). As stated above, these operations must be non-blocking.

However, the processing of an entire SQ WR such as an RDMA Write operation, including the eventual generation of a work completion (WC), is blocking as defined above because the processing may need to wait for a remote event such as the opening of the TCP congestion window or the peer's TCP receive window. If the Internet Wide Area RDMA Protocol (iWARP) RDMA transport is used and the iWARP protocols are implemented in software by using TCP sockets, then the transmission of an RDMAP message and associated RDMA frames involves the use of socket send, sendmsg or similar operations. In this case, remote events such as network congestion or lack of receive buffers can manifest locally as a closed TCP congestion window, a closed peer TCP receive window, or a lack of write or send space, resulting in a blocking socket send or sendmsg system call. Another example for a blocking operation is the processing of an RDMA Read SQ WR, which needs to wait for the RDMA Read Response from the remote RDMA device after sending an RDMA Read Request. Consequently, attempting to directly and synchronously process an entire SQ WR while posting the WR may block the application process. Analogous restrictions apply to RQ WR processing.

Transmission of RDMA frames is also needed for handling inbound RDMA Read Requests, which are queued on a local Inbound RDMA Read Queue (IRRQ). In a software implementation, the transmission of the associated RDMA Read Response is blocking in the above sense because it may need to wait for a remotely triggered event as described above for the processing of a SQ WR.

To ensure that posting a WR is non-blocking, a known solution is to process the RDMA operation described by the WR asynchronously. For an RDMA software implementation in a multi-tasking OS environment, such asynchronous processing can occur through a separate task or thread, be it in user space or in the OS kernel. However, delegating work to another task results in additional overhead as described below.

If a separate task or thread is used for asynchronous processing of RDMA operations and this task or thread should be able to handle multiple connections in a fair and non-blocking fashion, it is not always possible to fully process an RDMA operation, as this operation might block and prevent progress with other connections.

For the iWARP RDMA transport, if a separate kernel thread is used for asynchronous transmission (i.e., outside the user process context), then DDP segmentation and transport framing for sending an RDMAP message must access the user's source buffer through its underlying pages, since the buffer is not accessible via user virtual addresses. The pages are known to the iWARP sender through earlier memory registration (including memory pinning) performed by the user. A kernel thread can access these pages after mapping them to kernel virtual addresses. On a 32-bit processor, a kernel thread typically cannot access a user buffer through user virtual addresses due to address space limitations.

In an iWARP software implementation, asynchronously handling transmission presents several problems. By using a separate task or thread for asynchronous transmission in addition to the user process, a much higher context switch rate may result, causing increased CPU utilization and cache disturbance. Compared to synchronous processing in user process context, the code path length may grow. Using a task or thread per connection is undesirable because such a design would not scale to many connections. When using one task or thread for multiple connections, transmission operations associated with one connection may block operations for other connections. Due to network congestion or a closed TCP receive window, it may not be possible to fully process a given, possibly lengthy RDMA operation without blocking. When using one task or thread for multiple connections, the presence of lengthy operations and/or multiple work requests queued per connection raises fairness issues regarding the use of the data link. Before a kernel thread can access the user's source buffer through the underlying pages, these pages need to be mapped to kernel virtual addresses. On a 32-bit processor, kernel virtual addresses are a precious resource, and mapping a large number of pages can be problematic. When a kernel thread doing DDP segmentation and transport framing accesses a page of the user's source buffer after mapping it to kernel virtual addresses, L1 data cache performance may be degraded. Since this cache is keyed through virtual addresses, it may be unable to detect that the user and kernel virtual addresses of the source buffer in fact refer to the same physical memory, causing unnecessary L1 data cache misses. On the other hand, synchronously handling transmission is problematic as this operation may block due to remote or local events.

SUMMARY

Exemplary embodiments include an method for at least one of an application and transport process to send application data represented by a current work request to an RDMA transport peer while targeting a computer memory destination, the method including posting a new work request for transmission on at least one of an RDMA connection and association, determining if at least one prior work request is currently enqueued for processing, in response to a determination that no prior work request is currently enqueued for processing, processing the new work request by directly sending RDMA frames containing application data to the RDMA transport peer, targeting the computer memory destination and while there is sufficient send space to process the new work request, processing the new work request with direct sending, synchronously with and in a context of the at least one of an application and transport process posting the new work request.

Additional exemplary embodiments include a computer program product for at least one of an application and transport process to send application data represented by a current work request via RDMA to an RDMA transport peer while targeting a computer memory destination, the computer program product including instructions for causing a computer to implement a method, the method including posting a new work request for transmission on at least one of an RDMA connection and association, determining if at least one prior work request is currently enqueued for processing, in response to a determination that no prior work request is currently enqueued for processing, processing the new work request by directly sending RDMA frames containing application data to the RDMA transport peer, targeting the computer memory destination and while there is sufficient send space to process the new work request, processing the new work request with direct sending, synchronously with and in a context of the at least one of an application and transport process posting the new work request.

Further exemplary embodiments include an RDMA system for sending application data to a computer memory destination, the system including an RDMA application programming interface (API) such as IT-API or OpenFabrics, a user RDMA access layer (uAL) communicatively coupled to the RDMA API, a user RDMA verbs provider (uVP) communicatively coupled to the uAL, a kernel RDMA access layer (kAL) communicatively coupled to the RDMA API, a SoftRDMA kernel verbs provider (kVP) communicatively coupled to the kAL, a datamover thread communicatively coupled to the kVP, a network interface communicatively coupled to the SoftRDMA kVP, a direct sending communication path disposed between at least one of an application and transport process, and a kernel-provided transport layer and a direct sending communication path disposed between the kernel-provided transport layer and the network interface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 6A and 6B diagrammatically illustrates transmission vs. time for software-based iWARP, showing thread interactions with SQ processing in user or datamover context (direct sending) and a pause/resume scheme;

DETAILED DESCRIPTION

Figure 1:
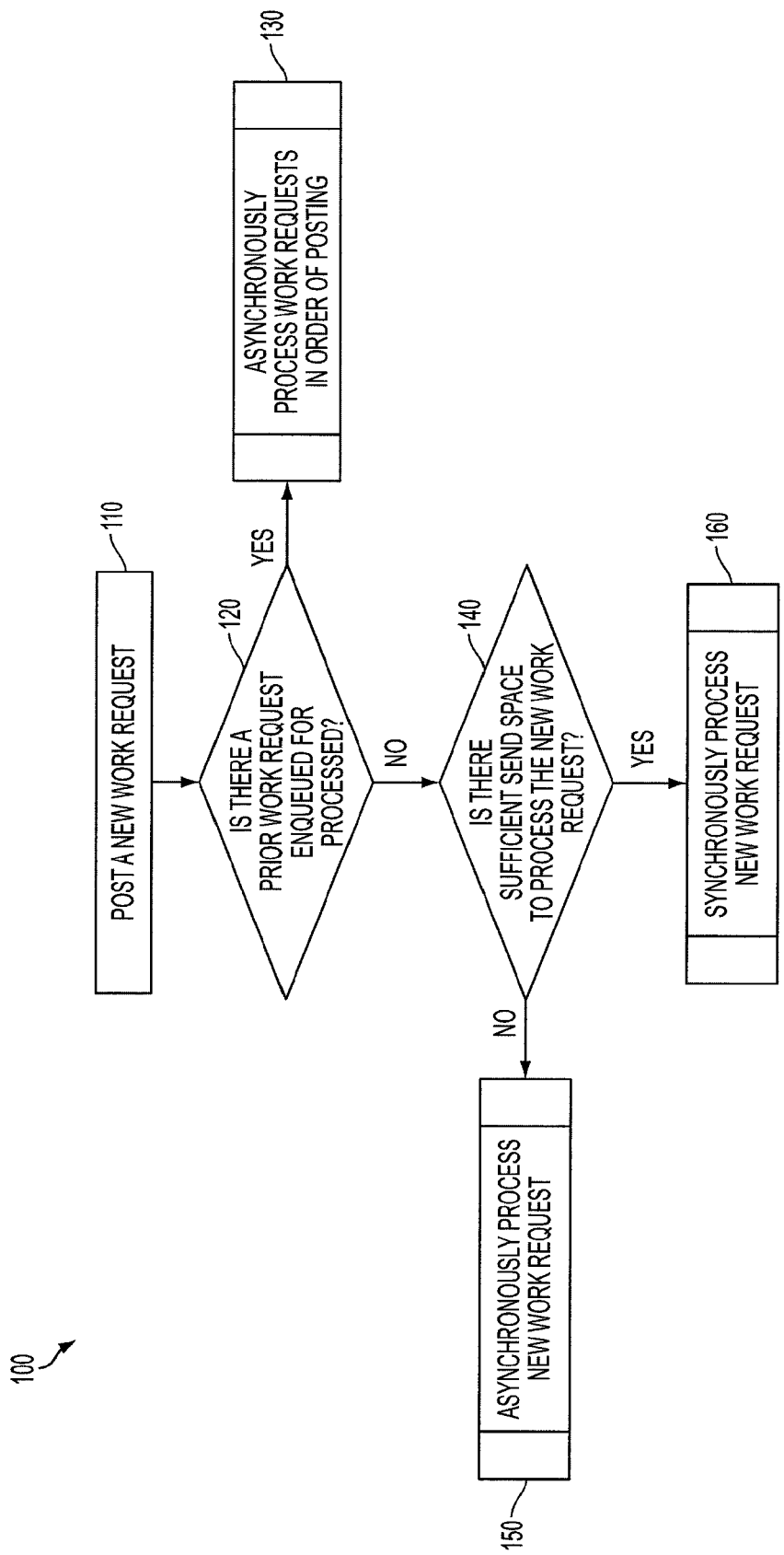
FIG. 1 illustrates an RDMA method for sending application data to a computer memory destination.

FIG. 1 illustrates an RDMA method 100 for sending application data to a computer memory destination. At block 110, a new work request is posted. At block 120, the method 100 determines if there is at least one prior work request enqueued for processing. If there is no prior work request already enqueued for processing at block 120, then at block 130, the method 100 can asynchronously process the at least one prior work request followed by the new work request as further described herein. If there is no prior work request enqueued at block 120, then at block 140, the method 100 determines if there is sufficient send space to send the new work request. If there is not sufficient send space to send the RDMA frames of the new work request at block 140, then the new work request can be processed asynchronously at block 150 as further described herein. If there is sufficient send space to process the new work request at block 140, then the work request is processed synchronously with posting the work request at block 110 and the application data referred to by the work request are sent to the destination via direct sending as described further herein.

As such, in exemplary embodiments, the systems and methods described herein implement non-blocking synchronous and asynchronous processing for transmission in RDMA software implementations. Direct sending of messages in user process context or, more generally, application process context is provided as long as there is sufficient send space for a non-blocking operation. Datamover kernel threads (referred herein as "datamovers") allow an RDMA software implementation to fully support asynchronous, non-blocking userspace I/O. By providing one datamover per CPU, the SMP capabilities of multi-core processor chips can be fully exploited. A datamover is capable of handling multiple RDMA connections by maintaining a list of active queue pairs (QPs) and a list of paused QPs. The datamover performs SQ processing for the active QPs in a round-robin or scheduled fashion.

To minimize context switching and the associated latency, direct sending starts SQ processing in a user process context or, more generally, an application process context. When the application posts a SQ WR, direct sending immediately starts processing the operation, unless one or more WRs are already outstanding on the SQ. If started, SQ processing for iWARP performs DDP segmentation and transport framing in the application process context as long as there is enough send space (and thus the send operations do not block). The entire operation may be processed in this context. When and only when TCP indicates lack of send space and thus would block the next send operation (e.g., because of network congestion), SQ processing is paused for this QP/connection and delegated to a datamover in kernel thread context, where it resumes only when send space for the connection again becomes sufficiently large. As a result, the function call posting the SQ WR returns without blocking before the WR has been fully processed, allowing the user to proceed doing other work.

When iWARP SQ processing for a particular active QP/connection occurs in datamover kernel thread context, DDP segmentation and transport framing take place as long as there is enough send space (and thus the send operations do not block). When TCP indicates lack of send space and thus would block the next send operation (e.g., because of network congestion), SQ processing is paused for this QP/connection and the QP is moved to the list of paused QPs. The processing for this connection resumes only when send space again becomes sufficiently large.

An operation that is "blocking" if processed atomically can sometimes be broken up, which allows suspending the operation (instead of blocking), performing some other useful work and resuming the original operation on some external event.

In exemplary embodiments, the systems and methods described herein support partial WR processing and, more generally, RDMA transmission, in units of up to one page at a time. Partial WR processing eliminates the need to process a WR atomically. As described herein, the partial WR processing is implemented for iWARP via DDP segmentation and transport framing on a page-by-page basis.

In exemplary embodiments, when the systems and methods described herein perform RDMA transmission on a page-by-page basis, each page is mapped to kernel virtual addresses on demand and immediately unmapped after transmission. When iWARP transmission occurs in application process context, the source buffer is accessed directly through virtual addresses of the current process context.

Figure 2:
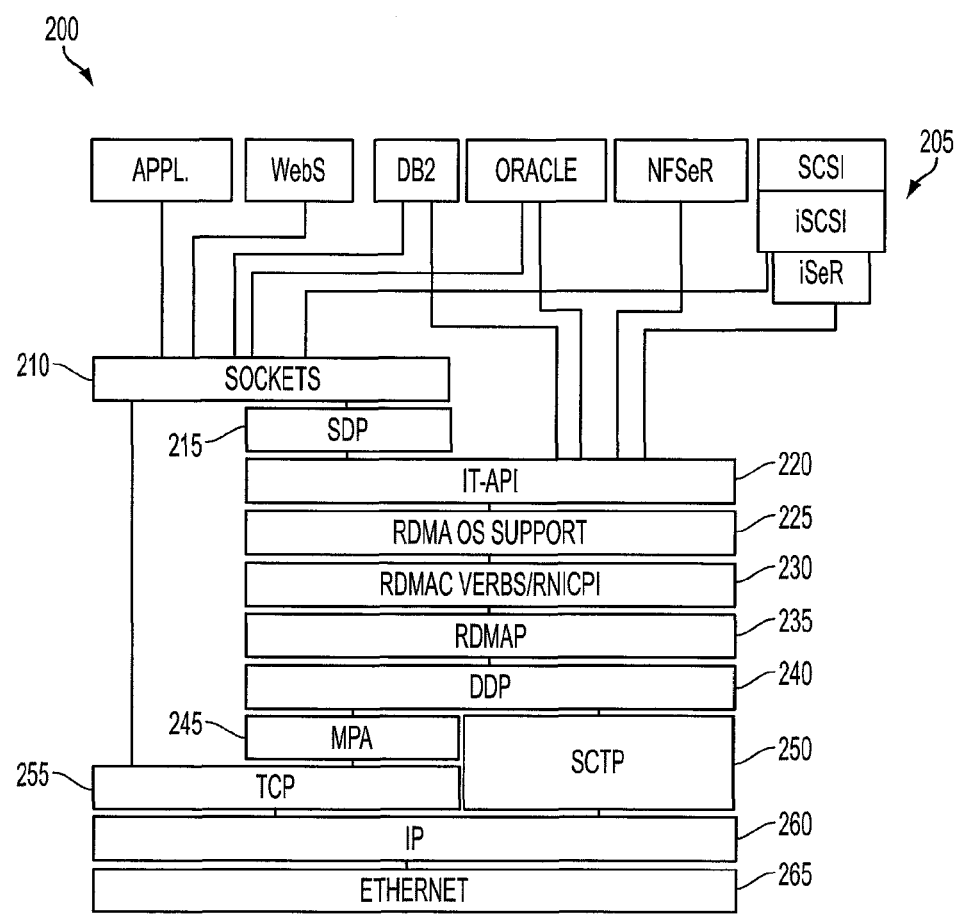
FIG. 2 illustrates a stack diagram of an RDMA framework.

As described above, and as known by those skilled in the art, RDMA enables the moving of application data from the memory of one computer to that of another without directly involving the host CPUs during data transfer. RDMA's main objective is to bypass the host CPU(s) during both network protocol processing and data placement, avoiding temporary data buffering (e.g. via intermediate socket buffering) and the associated intra-host data copy operations. FIG. 2 illustrates a diagram of a network stack 200 supporting RDMA-enabled applications as well as legacy applications using sockets. The network stack can include an application layer 205, which can include a socket layer 210 supporting legacy applications, which is coupled to a transmission control protocol (TCP) layer 255. The socket layer can also be in communication with a socket direct protocol (SDP) layer 215. The application layer 205 can also be in communication with an interconnect protocol application programming interface (IT-API) layer 220 or an equivalent RDMA API, which is in communication with an RDMA OS support layer 225. The RDMA OS support layer 225 is in communication with RDMA-capable (RDMAC) verbs/RDMA-capable network interface programming interface layer 230 such as RNICPI. For the iWARP transport, the interface layer 230 is in communication sequentially with a remote direct memory access protocol (RDMAP) layer 235, a direct data placement protocol (DDP) layer 240, and, in case of iWARP/TCP, a marker protocol data unit (PDU) aligned framing (MPA) layer 245. The DDP layer 240 can also be in communication with a stream control transmission protocol (SCTP) layer 250, and the MPA layer 245 can be in communication with the TCP layer 255. The framework can further include an internet protocol (IP) layer 260 in communication with an Ethernet layer 265. In exemplary embodiments, the systems and methods described herein enable direct sending of messages from the application layer 205 to the RDMA API layer 220, to the RDMAP and DDP layers 235, 240, to the MPA, TCP and IP layers 245, 255, 260 (or, alternatively, to the SCTP and IP layers 250, 260), and thus to the Ethernet hardware.

To enable "zero-copy operation" (i.e., the direct data placement to/from communication buffers), RDMA requires applications to perform explicit communication buffer management (i.e., to pre-register communication buffers as RDMA memory regions). Such registrations pin the buffers in memory to ensure that virtual-to-physical address mappings remain stable for subsequent DMA operations. Communication operations then refer to pre-registered buffers through associated keys.

Device and application programming specifications for RDMA including RDMAC verbs and its implementation within the Linux operating system reflect the asynchronous nature of DMA operations by providing asynchronous interfaces that allow: an application to post work requests (WRs) for data transfers to work queues; an RDMA device to process RDMA operations such as RDMA WRs asynchronously; an RDMA device to notify the user through a completion event when it is done processing a WR; and a user to reap a work completion (WC) for a WR from a completion queue. These semantics are tied to RDMA's ownership rules for communication buffers. By posting a WR for a data transfer to/from a buffer, the application temporarily passes ownership of the buffer to an RDMA device, which transfers the data through DMA and notifies the application upon completion.

Compared to synchronous designs, asynchronous work request processing has the advantage of allowing overlapping communication and computation. Moreover, asynchronous work request processing is desirable for a network device that needs to serve multiple users and handle many connections concurrently in a fair and non-blocking fashion.

For high-speed interconnects like Ethernet or InfiniBand, only a zero-copy scheme can deliver the full network bandwidth to the application as the link speed has caught up with host memory bandwidth. While initially limited to Infini-Band, RDMA is now available for Ethernet LANs and WANs through IETF's iWARP protocols RDMAP, DDP, and MPA.

For the iWARP RDMA transport, the RDMAP layer 235 uses the DDP layer 240 to provide read and write services directly to applications and enables data to be transferred directly between Upper Layer Protocol (ULP) buffers and Ethernet adapter buffers without intermediate data copies. RDMAP thus enables a kernel bypass implementation.

The DDP layer 240 provides information to place incoming data directly into an upper layer protocol's receive buffer without intermediate buffers. DDP removes excess CPU and memory utilization associated with transferring data through the intermediate buffers.

DDP segmentation partitions the payload of an RDMAP message into DDP segments, the smallest unit of data transfer for DDP. A DDP segment can be either untagged or tagged, depending on whether the ULP message targets an untagged or tagged buffer.

The MPA layer 245 is an "adaptation layer" between the TCP layer 255 and the DDP layer 240. MPA preserves the reliable, in-order delivery of TCP, while adding the preservation of higher-level protocol record boundaries that DDP requires. MPA is fully compliant with applicable TCP RFCs and can be utilized with existing TCP implementations. MPA also supports integrated implementations that combine TCP, MPA and DDP to reduce buffering requirements in the implementation and improve performance at the system level.

At the sender, MPA encapsulates each DDP segment into a framed PDU (FPDU). In order to enable the iWARP receiver to perform direct data placement despite potential losses of MPA/TCP header alignment and out-of-order reception of TCP segments, the MPA sender may be requested to periodically insert markers into TCP's byte stream. At the receiver, MPA and DDP typically cooperate to place the DDP segment in the target buffer, with or without the help of markers.

While the iWARP protocol stack is typically implemented in dedicated hardware (RDMA-enabled NICs or RNICs), a pure or partial iWARP software implementation ("SoftRDMA") can provide a generic (i.e., RDMA-hardware-independent) iWARP device driver that works on legacy Ethernet NICs (ENICs) or new Ethernet NICs of any available line speed without iWARP support. SoftRDMA can be further enhanced by adding partial iWARP hardware acceleration (e.g., for the MPA CRC), for an overall iWARP implementation that is low cost, performance and "green" (power saving). SoftRDMA can also be enhanced with multi-core optimizations, where iWARP connections/processing may be balanced across multiple CPUs. In addition, SoftRDMA can create low-cost RDMA/Ethernet-based compute clusters and provide means for iWARP protocol conformance testing.

The advent of iWARP enables RDMA for numerous Ethernet-based applications. The migration of applications to RDMA using conventional ENICs is attractive for asymmetric networking applications, where one side has no RNIC available but plenty of compute cycles to spend while the other side depends on the use of RDMA hardware for efficient data transfers at a high overall throughput.

Figure 3:
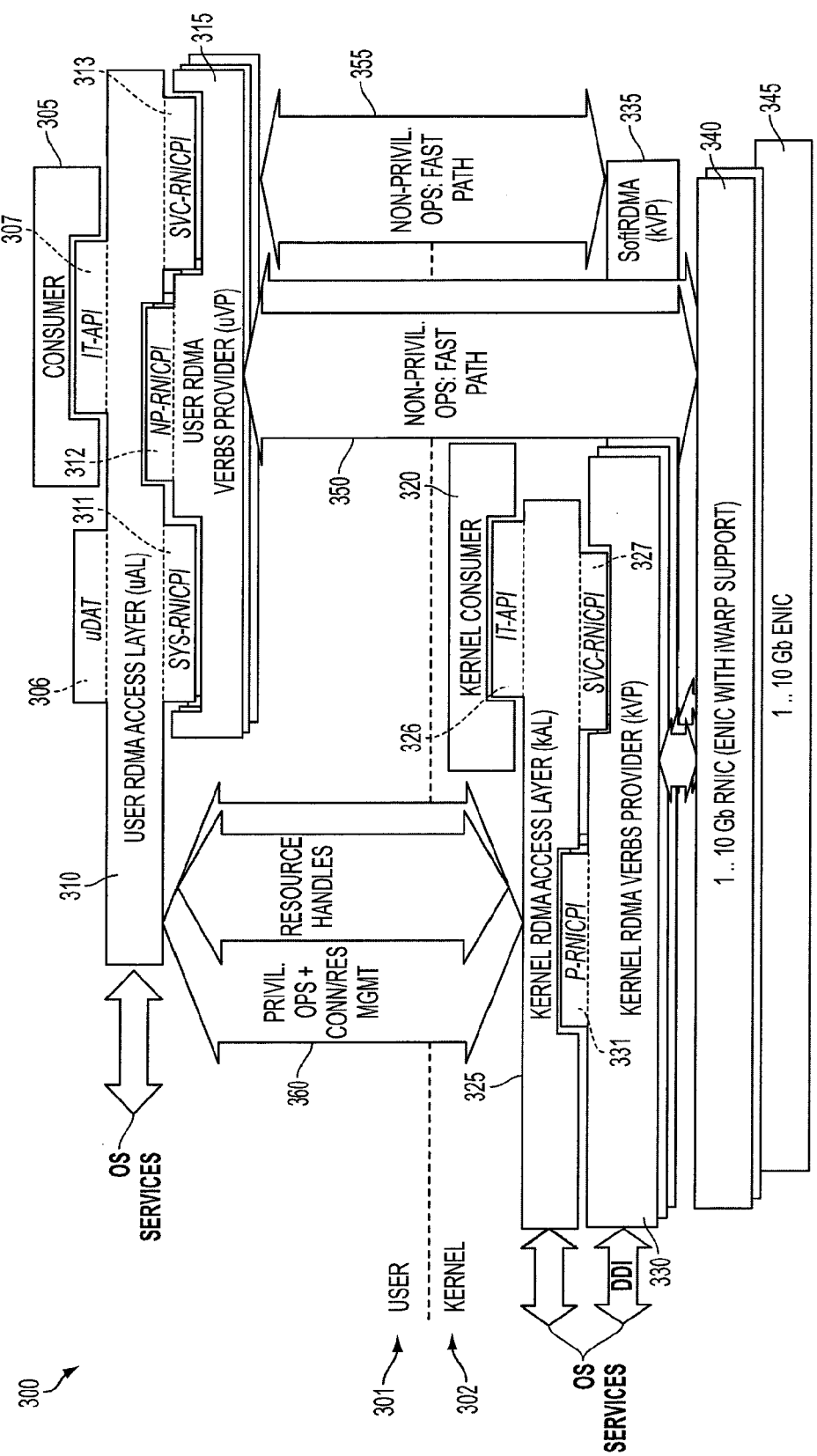
FIG. 3 illustrates an exemplary RDMA framework with SoftRDMA.

FIG. 3 illustrates an exemplary RDMA framework 300 with SoftRDMA. In exemplary embodiments, the framework 300 includes a user portion 301 and a kernel portion 302. The framework 300 can include a consumer (user application) layer 305 in which a user interacts with the framework 300. The framework 300 can further include a user RDMA access layer (uAL) 310. The uAL 310 is a host stack implementation that represents all OS generic RDMA support in a non-privileged domain. The framework 300 can further include a system, non-privileged and service RNICPI interface (SYS-RNICPI, NP-RNICPI, SVC-RNICPI) 311, 312, 313. The uAL 310 exports the SYS-RNICPI and the SVC-RNICPI interfaces 311, 313. The uAL 310 can further export a user data (uDAT) interface 306, an IT-API interface 307, or an equivalent RDMA API. The framework 300 can further include a user RDMA verbs provider (uVP) 315, which implements vendor private code to access the RNIC hardware from the non-privileged domain. The uVP 315 exports the NP-RNICPI interface 312 to the uAL 310.

In exemplary embodiments, the kernel portion 302 of the framework 300 can include a kernel consumer (application) 320 in communication with an RDMA API 326 (for example, IT-API) exported by a kernel RDMA access layer (kAL) 325, which represents all OS generic RDMA support in the privileged domain. The kAL 325 can further export a SVC-RNICPI interface 327. The framework 300 can further include a kernel RDMA verbs provider (kVP) 330, which is an RNIC vendor private kernel software module that typically implements the vendor-specific code to access the RNIC hardware 340 from the privileged domain. The kVP 330 can export a privileged RNICPI (P-RNICPI) interface 331. The kVP 330 exports the P-RNICPI interface 331 to the kAL 325. For hardware-based iWARP implementations, the framework 300 can include RDMA enabled network interface cards (RNIC) 340, i.e., Ethernet network interface cards (ENIC) supporting iWARP.

In exemplary embodiments, the framework 300 can further include a SoftRDMA kVP 335 for which direct sending can be implemented. The framework 300 can further include an Ethernet network interface card (ENIC) 345. In exemplary embodiments, the systems and methods described herein enable a fastpath between the user portion 301, the SoftRDMA kVP 335 and the ENIC 345. The fastpath between user and kernel may be implemented through path 355, i.e., by direct access to work queues visible from user and kernel space. Alternatively, this fastpath may be implemented via non-blocking system calls via path 360.

Figure 4:
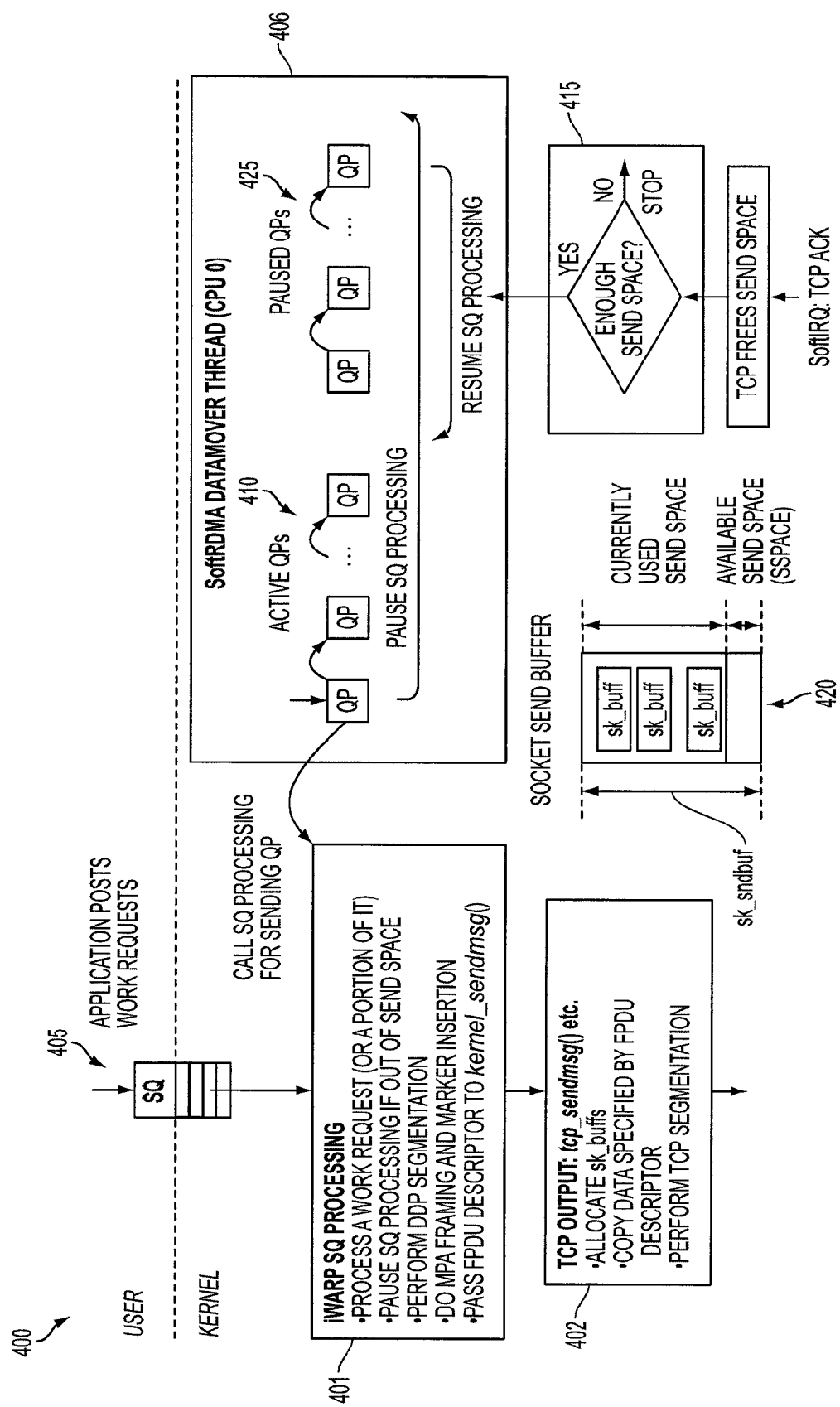
FIG. 4 illustrates an iWARP transmit path of software-based iWARP with combined support for direct sending and asynchronous, non-blocking transmission.

The transmit path of an iWARP software implementation according to exemplary embodiments using a TCP kernel socket is shown in FIG. 4, with iWARP send queue (SQ) processing 401 and TCP processing 402. FIG. 4 illustrates an iWARP transmit path of software-based iWARP with combined support for direct sending and asynchronous, non-blocking transmission.

A SQ work request 405 specifies a source buffer as one or more segments of pre-registered memory regions (MRs), i.e., as a gather list comprising triplets of the form (STag, addr, len), where STag, addr and len are a steering tag identifying a MR, a starting address within that MR, and the segment length, respectively. Each STag refers to a chained list of underlying page frames and has an associated base address.

For illustrative purposes, SQ processing for a single connection is considered. When the application posts a SQ WR, a system call passes the WR to the privileged iWARP SQ Processing 401, which may effectively enqueue the WR on the SQ. If no prior WR for this connection is currently in progress, block 401 immediately starts processing the new WR as long as there is enough send space. The processing includes DDP segmentation and transport framing (for example, MPA framing, possibly including marker insertion). The processing results in passing FPDU descriptors to the kernel socket. For a TCP kernel socket, the subsequent processing steps are shown in 402. If block 401 determines that the socket is running out of send space, it registers the QP with a datamover 406 for asynchronous SQ processing, effectively inserting the QP into the datamover's list of active QPs 410; after registering, block 401 returns control to the application (not shown in FIG. 4). If block 401 initially determines that a prior WR for this connection is still in progress, the QP is already registered and block 401 also returns control to the application. If a QP is registered with the datamover 406, SQ processing for this QP is performed asynchronously. While there's enough send space, the datamover 406 now performs iWARP SQ Processing 401 including DDP segmentation and transport framing.

The SQ processing 401 may occur in chunks of up to one page of physically contiguous RDMAP payload. The amount of physically contiguous payload may be less than a page at the beginning or end of a source buffer segment and is exactly one page in between. In exemplary embodiments, to prevent wasted kernel mappings, a software-based iWARP implementation dynamically maps a source buffer page to kernel virtual addresses for passing the corresponding FPDUs to the socket and unmaps it immediately after use. If direct sending is enabled and SQ processing occurs in user process context, the current page can be accessed directly through user virtual addresses, which avoids mapping the payload page twice.

In exemplary software-based iWARP embodiments, for transmitting the contents of the page, a series of MPA FPDU descriptors is prepared. An FPDU descriptor is an array of data structure elements (e.g., iovec) forming a gather list for composing the FPDU from RDMAP/DDP/MPA header data, user payload, MPA marker information placed every 512 bytes, and MPA trailer data including the MPA CRC32C. The FPDU descriptor is passed to the sendmsg socket call, which in turn passes it to TCP's sendmsg.

In order to prevent the datamover 406 thread from blocking on a particular connection, SQ processing is paused for that connection by not sending the next len_src<=PAGE_SIZE bytes of physically contiguous RDMAP payload if the resulting FPDUs would exceed the available socket send space. By knowing TCP's effective maximum segment size (EMSS), the FPDU sizes can be pre-computed even in the presence of marker insertion. In alternate exemplary embodiments, SQ processing can continue as long as at least some fraction of the send buffer such as ¼ is available.

FIG. 4 further illustrates that the TCP socket copies FPDU data to the socket send buffer 420. While the data copying is not necessary because of iWARP's buffer ownership rules, it usually cannot be avoided with the sendmsg socket call.

In exemplary embodiments, the iWARP SQ processing continues until the socket send buffer 420 runs out of send space. The QP from the active QPs 410 is now moved to the list of paused QPs 425 and, if there is no other active QP, the datamover 406 thread falls asleep. When TCP frees send space later on (e.g., because of a soft interrupt processing a TCP ACK), the iWARP software implementation can use a socket callback 415 to determine if send space is sufficient to continue sending. When this event occurs, SQ processing is resumed, which effectively moves the QP from the list of paused QPs 425 back to the list of active QPs 410 and wakes the datamover thread 406.

As such, the datamover 406 handles each QP's SQ WRs in sequence and at page granularity while being able to alternate between QPs as a result of congestion/flow control or in order to shape traffic. CPU affinity between application and datamover 406 permits a cache-efficient operation. Moreover, the capability of a datamover to handle many connections avoids an excessive number of threads.

Figure 5A:
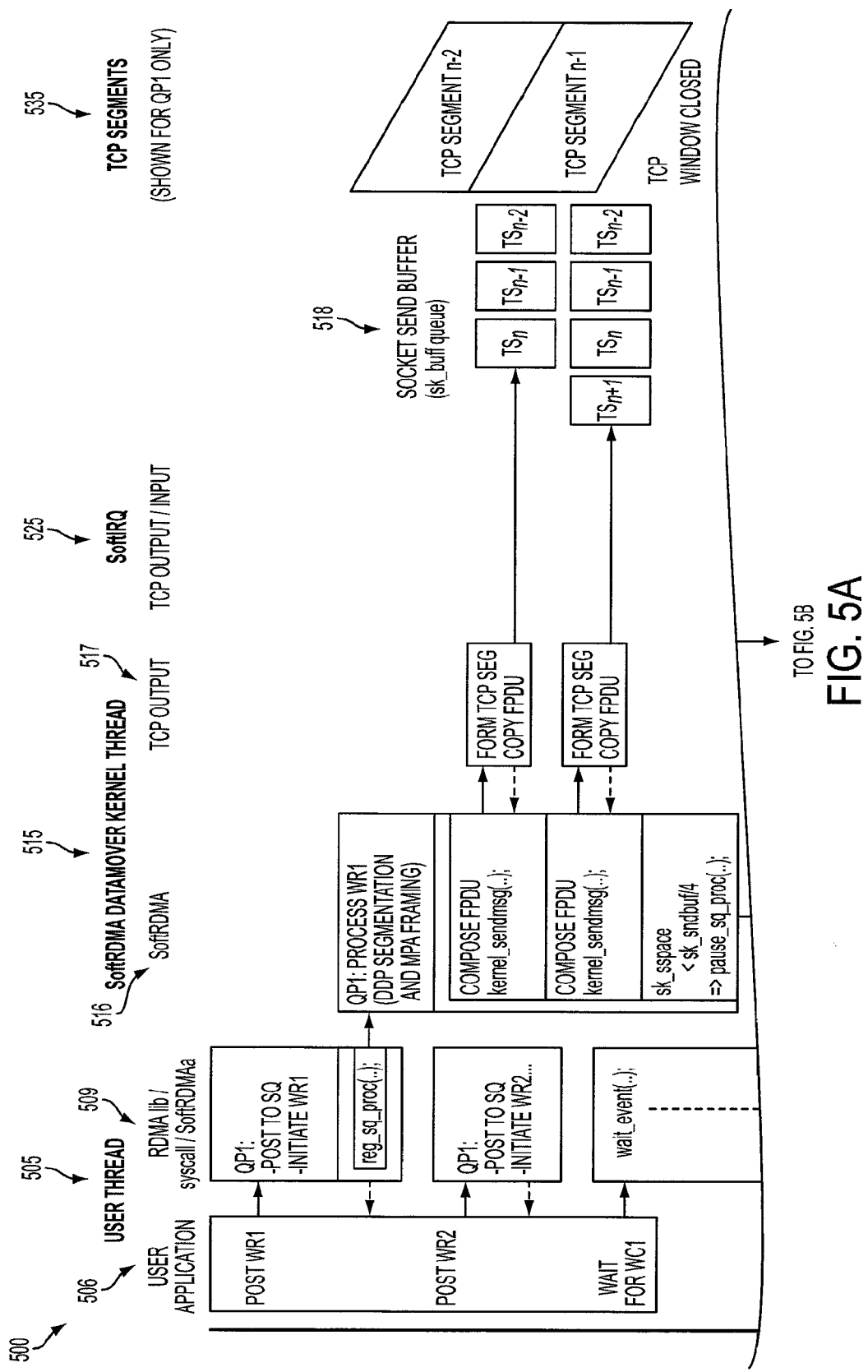
FIGS. 5A and 5B diagrammatically illustrate transmission vs. time and the interactions of threads and processor contexts involved when software-based iWARP SQ processing is configured to occur only in the context of a datamover kernel thread, and a pause/resume scheme.
Figure 5B:
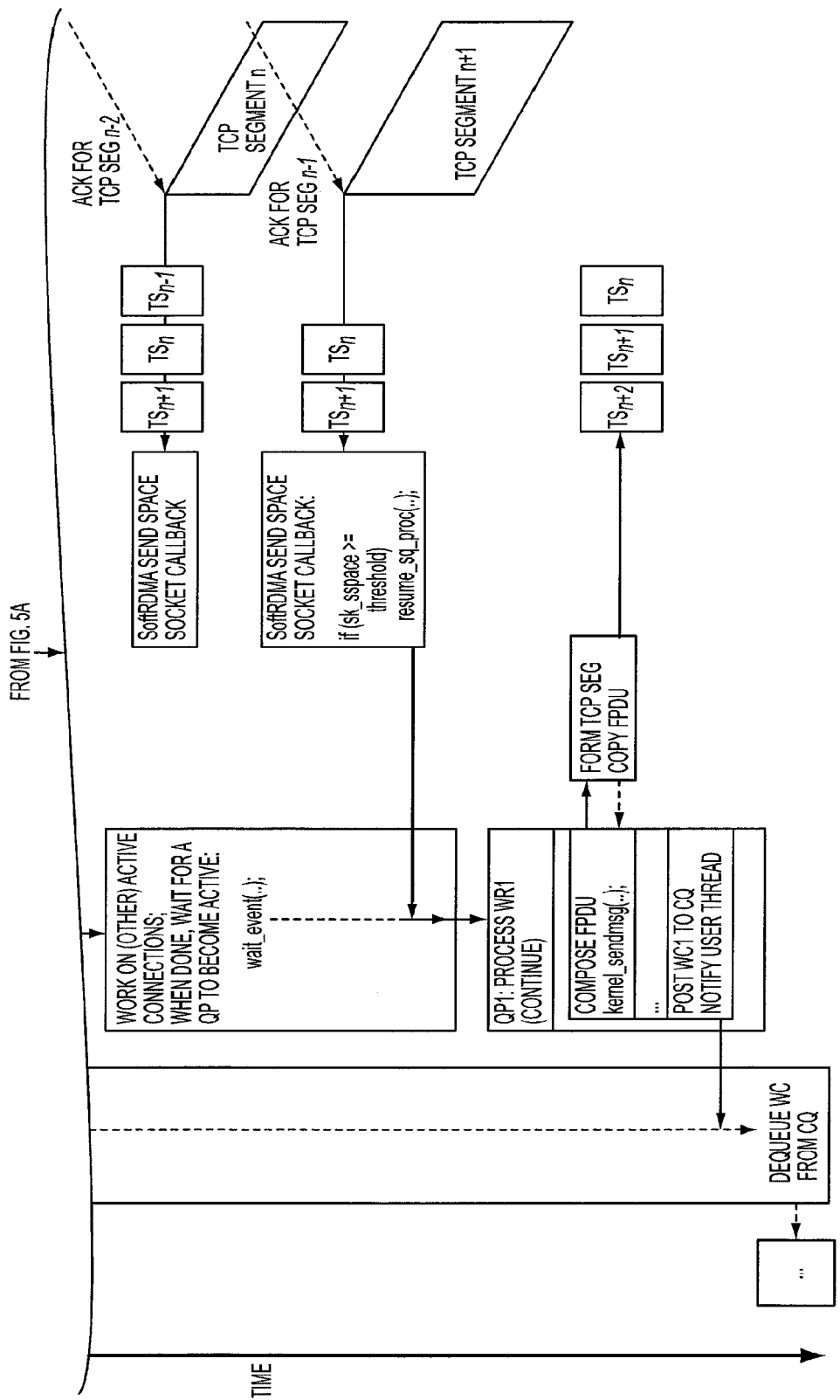

FIGS. 5A and 5B diagrammatically illustrate transmission vs. time 500, showing the threads and processor contexts involved when software-based iWARP SQ processing is configured to occur only in the context of a datamover kernel thread. FIGS. 5A and 5B depict the interactions between a user thread 505, a SoftRDMA datamover kernel thread 515, and a soft interrupt (SoftIRQ) context 525. FIGS. 5A and 5B further illustrate the transmitted and received TCP segments 535.

In a user thread context (or, more generally, application thread context) 505, the RDMA application 506 posts work requests such as WR1, WR2 and is prepared to asynchronously handle the resulting work completions such as WC1. For illustrative purposes, the work requests WR1, WR2 and the work completion WC1 are discussed. It is understood that there are additional or fewer work requests and work completions in other exemplary embodiments. In exemplary implementations, the posting of WR1, WR2 and polling of and/or waiting for WC1 occurs through an RDMA library 509. The posting of WR1 and/or W2 and polling WC1 are non-blocking operations. In exemplary embodiments, when WR1, WR2 are posted to the SQ of a queue pair QP1, a system call causes the kernel device driver of the iWARP software implementation to initiate WR1, which calls reg_sq_proc to register QP1 with a datamover for SQ processing. The posting of WR1 is now done and the user application can proceed with other work. At some later time, the application may wait for WC1, calling it_evd_wait in case of IT-API or ibv_get_cq_event followed by ibv_poll_cq for OpenFabrics.

The SQ processing is now performed in datamover context 515 and includes DDP segmentation and MPA framing in SoftRDMA 516. In the datamover context, TCP output 517 processing forms a TCP segment 535 (referred to as $TS_n$) from the MPA FPDU, which is enqueued to the socket send buffer queue 518. FPDU packing (i.e., the process of sending more than one FPDU per TCP segment) may also be implemented. Each TCP segment remains in the socket send buffer queue until it has been ACKed by the peer. A TCP segment may be output to the wire right from the datamover context, or from the SoftIRQ context 525 when the TCP window opens up due to a received ACK.

FIGS. 5A and 5B also illustrate an exemplary pause/resume scheme. At some point, when TCP segments have queued up due to a closed TCP window, the datamover cannot make further progress with QP1 due to lack of socket send buffer 518 space and pauses SQ processing for QP1 by calling pause_sq_proc. Instead of blocking, the datamover now proceeds with other QPs that are currently active until a SoftRDMA send space callback in SoftIRQ context 525 causes SQ processing to resume for QP1 by invoking resume_sq_proc.

In exemplary embodiments, after passing all FPDUs of WR1 to the TCP kernel socket, the datamover thread posts the corresponding work completion WC1 to the CQ associated with QP1 and notifies (wakes) the user thread. When no pending WRs are left on QP1's SQ, the datamover thread deregisters QP1 from SQ processing by calling dereg_sq_proc (not shown in FIGS. 5A and 5B).

The datamover kernel threads are introduced for processing WRs asynchronously, which allows user applications to post SQ WRs without blocking. While SQ processing in user (or, more generally, application) context is desirable for minimizing context switches, it is an operation that is likely to block without the exemplary methods described herein.

Figure 6B:
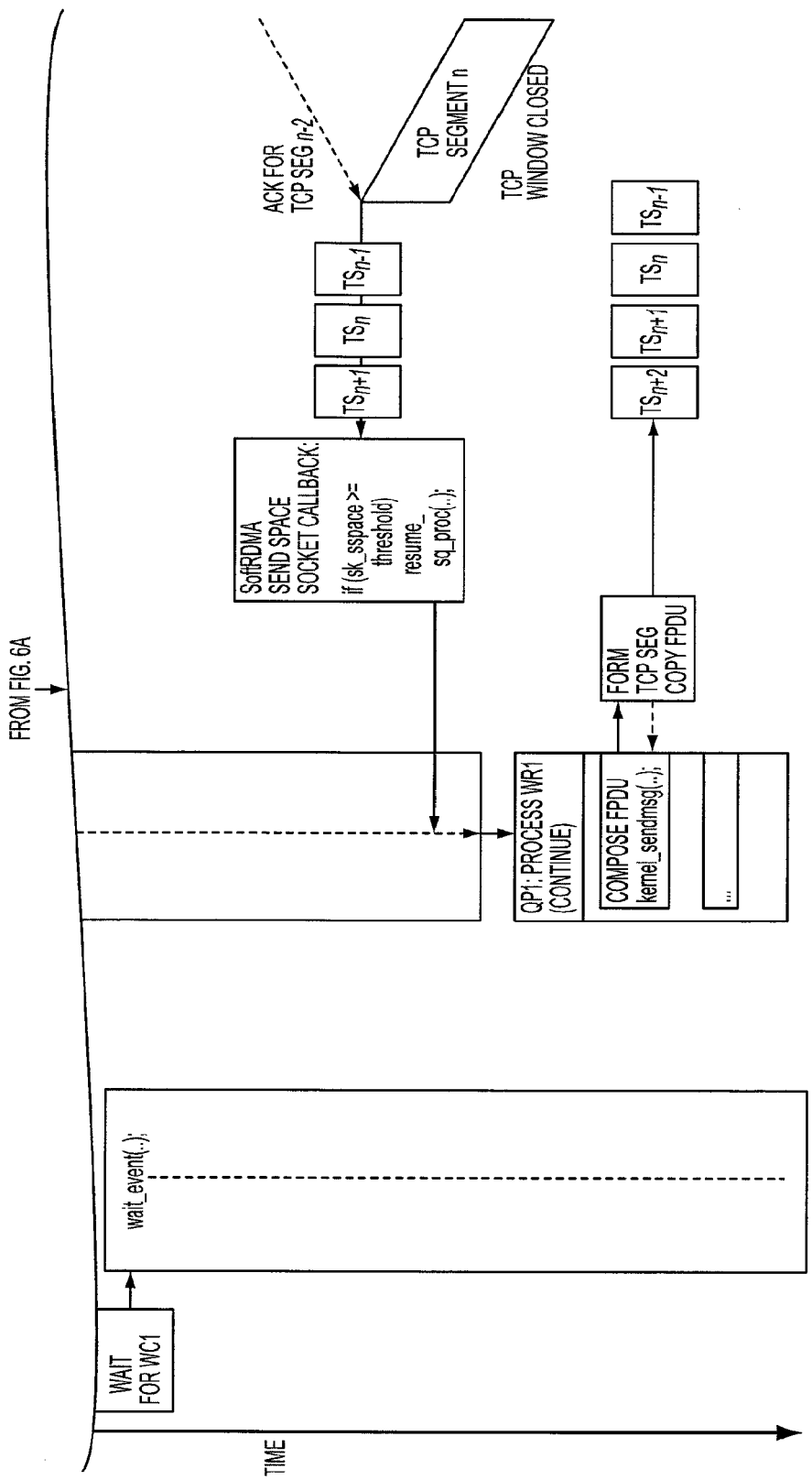

FIGS. 6A and 6B diagrammatically illustrate transmission vs. time 600 for software-based iWARP, showing thread interactions with SQ processing in user or datamover context (direct sending) and the operation of the pause/resume scheme. FIGS. 6A and 6B depict the interactions among a user thread 605, a SoftRDMA datamover kernel thread 615, and a SoftIRQ context 625. FIGS. 6A and 6B further illustrate the transmitted and received TCP segments 635.

As shown in FIGS. 6A and 6B, software-based RDMA can achieve both non-blocking behavior and a reduction of context switching overhead by allowing SQ processing to start in user thread context 609 and by letting it continue in datamover context 616 only if needed. If no other SQ operations are pending and socket send space is available, posting and initiating WR1 causes SQ processing including DDP segmentation and transport framing to start directly in user thread (or, more generally, application thread) context. Besides reducing context switching overhead, direct sending also reduces latency. When too many TCP segments (referred to as $TS_{n-1}$, $TS_n$, $TS_{n+1}$, $TS_{n+2}$) are queueing up, the user thread 605 cannot make further progress with QP1 due to lack of socket send buffer space 618 and registers QP1 with a datamover for SQ processing in paused state by calling reg_sq_proc_paused. The user application 606 can now proceed doing other work.

As a result of incoming TCP ACKs in SoftIRQ context, socket send space may grow, which advantageously triggers a "send space available" socket callback installed by the iWARP software implementation. This callback compares the socket send space to a preselected threshold. If the threshold is exceeded, the callback invokes resume_sq_proc, which lets SQ processing continue in datamover context. The implementation of an appropriate threshold can avoid unproductive resume requests, where the datamover context cannot make progress due to insufficient data.

EXAMPLES

Figure 7:
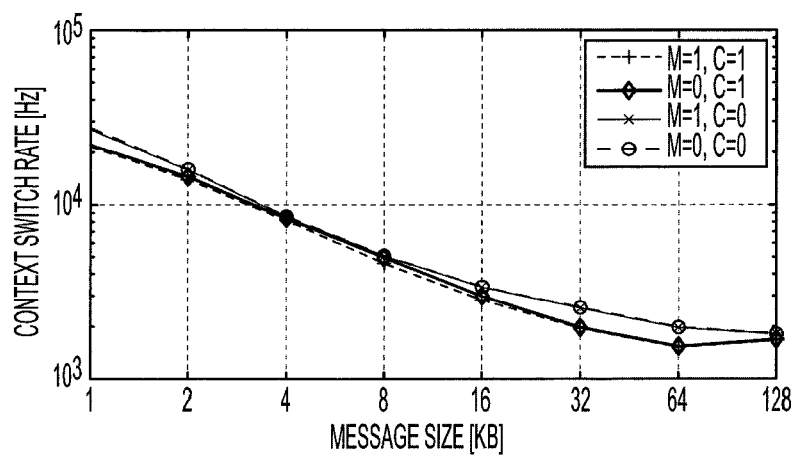
FIG. 7 illustrates a plot of context switch rate versus message size in the absence of direct sending.

FIG. 7 illustrates a plot 700 of context switch rate versus message size. The plot 700 is a result of an iWARP Send/Receive Test on 1 Gb/s Ethernet, PMTU=1500. As such, the context switch rate of software-based iWARP sender (Linux) is shown with MPA markers (M) and CRC32C (C) enabled or disabled. In this example, direct sending is disabled, i.e., all transmit processing is performed by the datamover kernel thread.

Figure 8:
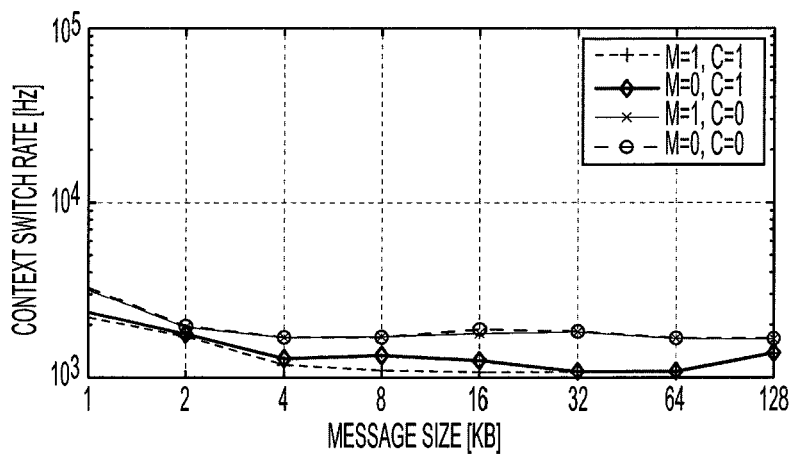
FIG. 8 illustrates a plot of context switch rate versus message size with direct sending enabled.

FIG. 8 illustrates a plot 800 of context switch rate versus message size. The plot 800 is a result of an iWARP Send/Receive Test on 1 Gb/s Ethernet, PMTU=1500. As such, the context switch rate of software-based iWARP sender (Linux) is shown with MPA markers (M) and CRC32C (C) enabled or disabled similar to the example in FIG. 7. However, exemplary direct sending is enabled. Most transmit processing is performed in user process context. As such, it is appreciated that the context switch rate is significantly reduced, by a factor up to 10.

Figure 9:
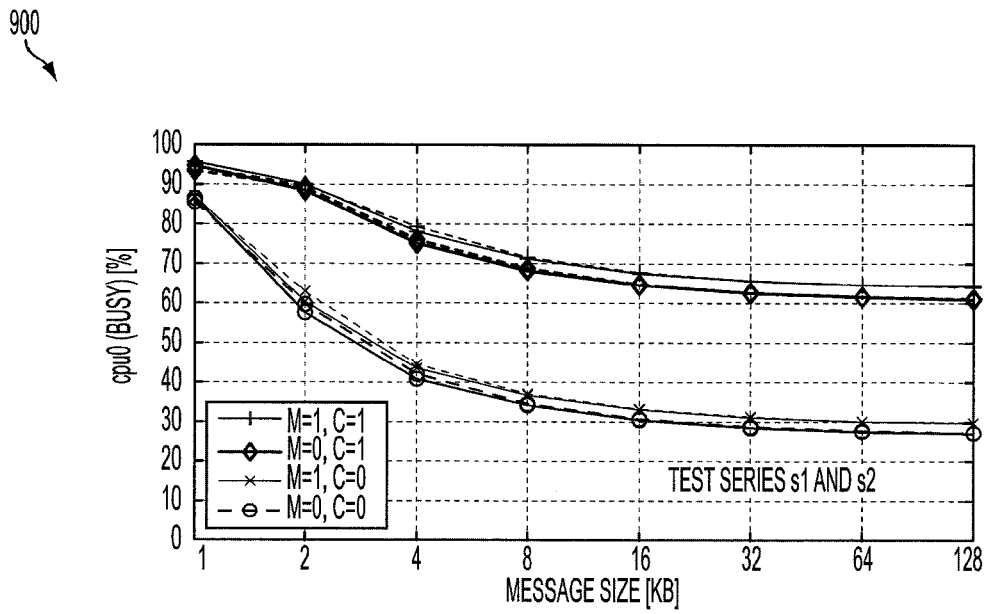
FIG. 9 illustrates a plot of CPU load versus message size, where solid (dashed) lines are with (without) direct sending.
Figure 10:
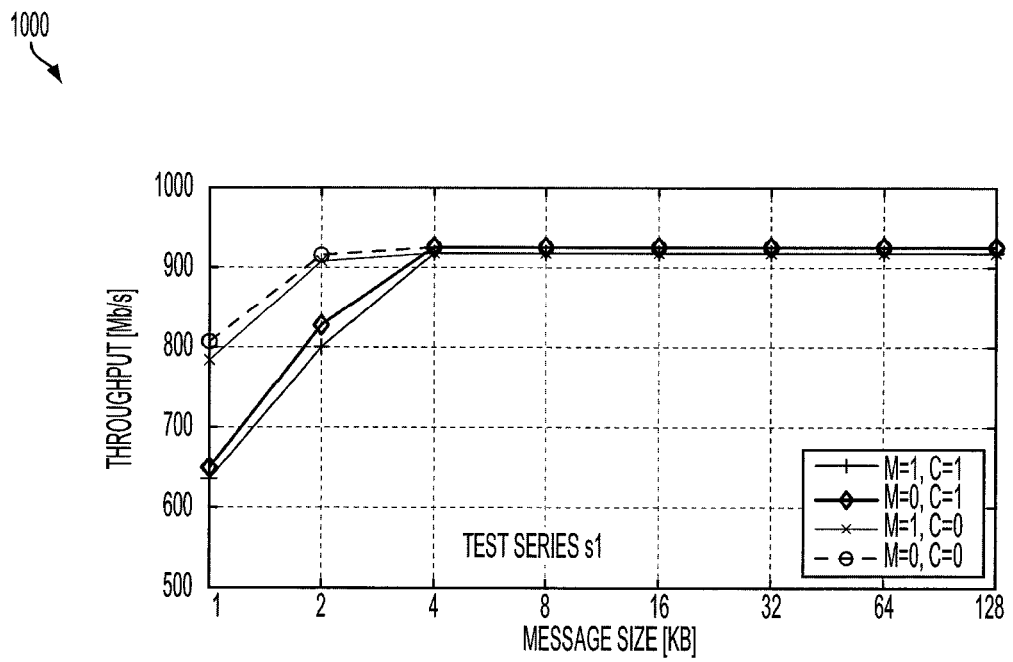
FIG. 10 illustrates a plot of throughput versus message size.

FIG. 9 illustrates a plot 900 of CPU load versus message size. The plot is a result of an iWARP Send/Receive Test on 1 Gb/s Ethernet, PMTU=1500. As such, the total CPU load of software-based iWARP sender (Linux), with MPA markers (M) and CRC32C (C) enabled or disabled is shown. Solid (dashed) lines are with (without) exemplary direct sending. Accurate CPU load measurement is based on hardware performance counters. FIG. 10 illustrates a plot 1000 of throughput versus message size. The plot is the result of the iWARP Send/Receive Test on 1 Gb/s Ethernet, PMTU=1500 of FIG. 8. As such, the throughput of software-based iWARP sender (Linux), with MPA markers (M) and CRC32C (C) enabled or disabled is shown.

FIG. 9 illustrates the CPU load of the sender with and without direct sending. Despite the significant reduction of context switch rate at message sizes of 4 KB or less as shown in FIGS. 7 and 8, the CPU load without direct sending is only 2% higher. This result shows that the use of a kernel thread for asynchronous work request processing has a very small cost that is lowered further by direct sending. Throughput is not affected by direct sending and shown in FIG. 10.

The exemplary embodiments described herein can be implemented not only for SQ processing but more generally for all software-based RDMA transmission operations, including the processing of RDMA Read Responses. Specifically, the direct sending implementations permit a kernel thread or even a SoftIRQ handling an inbound RDMA Read Request to generate the associated RDMA Read Response through direct sending, which minimizes latency. Furthermore, the exemplary embodiments described herein can be adapted for use by kernel applications instead of userspace applications. In addition, the exemplary embodiments described herein can be implemented with iWARP software implementations based on TCP sockets or with optimized designs that avoid the intermediate socket buffering that is typically present with TCP sockets by exploiting the communication buffer ownership semantics of RDMA. While the concept of a datamover kernel thread and the pause/resume scheme are described herein for asynchronous transmission, they can be applied to asynchronous reception in an analogous manner.

Technical effects include, but are not limited to full support for non-blocking execution of SQ work requests and, more generally, RDMA transmission for a software-based implementation; asynchronous processing of RDMA transmission on demand (i.e., only when there is a need to defer the processing); asynchronous transmission supports multiple RDMA connections per datamover kernel thread and thus scales to many connections; significant reduction of context switch rate by directly performing RDMA transmission from the application process context whenever possible without blocking, which reduces average code path length as well as cache disturbances due to context switching; RDMA transmission operations cannot block due to remote events (in particular, backpressure from transport-layer congestion/flow control on a particular QP does not stall transmission from other (active) QPs; partial WR processing enables a datamover to achieve fair link usage among connections through a more fine-grained and balanced scheduling of SQ operations, e.g., by using a credit-based scheme; and source buffer pages are mapped to kernel virtual addresses only when needed, which avoids mapping many pages simultaneously and also avoids mapping the same page twice when RDMA transmission takes place in application process context, which would be detrimental to L1 data cache performance.

The terminology used herein is for the purpose of describing particular embodiments only and is not intended to limit the scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just examples. There may be many variations to these diagrams or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A remote direct memory access (RDMA) method for at least one of an application and transport process to send application data represented by a current work request to an RDMA transport peer while targeting a computer memory destination, the method comprising:
   posting a new work request for transmission on at least one of an RDMA connection and association;
   determining if at least one prior work request is currently enqueued for processing;
   in response to a determination that no prior work request is currently enqueued for processing, processing the new work request by directly sending RDMA frames containing application data to the RDMA transport peer, targeting the computer memory destination; and
   while there is sufficient send space to process the new work request;
   processing the new work request with direct sending, synchronously with and in a context of the at least one of an application and transport process posting the new work request,
   else, while there is insufficient send space to process the new work request,
   processing the new work request asynchronously via non-blocking system calls.

2. The method as claimed in claim 1 further comprising:
   performing DDP segmentation and transport framing in response to a determination that there is sufficient send space to process the current work request,
   wherein the work request is processed in the context of the process posting the work request.

3. The method as claimed in claim 2 wherein the application data of the current work request is directly sent to the computer memory destination via an RDMA transport.

4. The method as claimed in claim 1 further comprising pausing transmission for the at least one of the current RDMA connection and association in response to a determination that a lack of send space would block a subsequent transmission operation, thereby changing the current connection to a paused current connection.

5. The method as claimed in claim 4 further comprising tracking the at least one of the paused current connection and association on a list of paused connections and associations.

6. The method as claimed in claim 4 further comprising delegating remaining work associated with the current work request to a datamover thread for asynchronous processing.

7. The method as claimed in claim 6 further comprising in response to a determination that at least one prior work request is currently enqueued for processing, commencing processing of the new work request in a datamover thread, wherein commencing processing of the new work request is asynchronous with posting the new work request.

8. The method as claimed in claim 7 further comprising:
   performing DDP segmentation and transport framing in response to a determination that there is sufficient send space to process the current work request,
   wherein the work request is processed in a datamover thread context.

9. The method as claimed in claim 7 wherein the application data of the current work request is sent to the computer memory destination via software-based RDMA.

10. A computer program product for at least one of an application and transport process to send application data represented by a current work request via remote direct memory access (RDMA) to an RDMA transport peer while targeting a computer memory destination, the computer program product including a non-transitory computer readable medium having instructions for causing a computer to implement a method, the method comprising:
    posting a new work request for transmission on at least one of an RDMA connection and association;
    determining if at least one prior work request is currently enqueued for processing;
    in response to a determination that no prior work request is currently enqueued for processing, processing the new work request by directly sending RDMA frames containing application data to the RDMA transport peer, targeting the computer memory destination; and
    while there is sufficient send space to process the new work request;
    processing the new work request with direct sending, synchronously with and in a context of the at least one of an application and transport process posting the new work request,
    else, while there is insufficient send space to process the new work request,
    processing the new work request asynchronously via non-blocking system calls.

11. The computer program product as claimed in claim 10 wherein the method further comprises:
    performing DDP segmentation and transport framing in response to a determination that there is sufficient send space to process the current work request,
    wherein the work request is processed in the context of the process posting the work request.

12. The computer program product as claimed in claim 11 wherein the application data of the current work request is directly sent to the computer memory destination via an RDMA transport.

13. The computer program product as claimed in claim 10 wherein the method further comprises pausing transmission for the at least one of the current RDMA connection and association in response to a determination that a lack of send space would block a subsequent transmission operation, thereby changing the current connection to a paused current connection.

14. The computer program product as claimed in claim 13 wherein the method further comprises tracking the at least one of the paused current connection and association on a list of paused connections and associations.

15. The computer program product as claimed in claim 13 wherein the method further comprises delegating remaining work associated with the current work request to a datamover thread for asynchronous processing.

16. The computer program product as claimed in claim 15 wherein the method further comprises, in response to a determination that at least one prior work request is currently enqueued for processing, commencing processing of the new work request in a datamover thread, wherein commencing processing of the new work request is asynchronous with posting the new work request.

17. The computer program product as claimed in claim 16 wherein the method further comprises:
    performing DDP segmentation and transport framing in response to a determination that there is sufficient send space to process the current work request,
    wherein the work request is processed in a datamover thread context.

18. The computer program product as claimed in claim 16 wherein the application data of the current work request is sent to the computer memory destination via software-based RDMA.

19. A remote direct memory access (RDMA) computing system for sending application data to a computer memory destination, the computing system comprising:
- a processor;
- a memory;
- an RDMA application programming interface (API);
- a user RDMA access layer (uAL) communicatively coupled to the RDMA API;
- a user RDMA verbs provider (uVP) communicatively coupled to the uAL;
- a kernel RDMA access layer (kAL) communicatively coupled to the RDMA API;
- a SoftRDMA kernel verbs provider (kVP) communicatively coupled to the kAL;
- a datamover thread communicatively coupled to the kVP;
- a network interface communicatively coupled to the SoftRDMA kVP;
- a direct sending communication path disposed between at least one of an application and transport process, and a kernel-provided transport layer; and
- a direct sending communication path disposed between the kernel-provided transport layer and the network interface, wherein the application and transport process:
- processes a new work request with direct sending, synchronously with and in a context of the at least one of an application and transport process posting the new work request while there is sufficient send space to process the new work request;
- else, while there is insufficient send space to process the new work request,
- processes the new work request asynchronously via non-blocking system calls while there is a lack of sufficient send space to process the new work request.

20. The system as claimed in claim 19 wherein RDMA frames containing application data represented by the work request are directly sent to at least one of the kernel-provided transport layer and the network interface in response to a determination that no prior work request of at least one of a connection and an association is currently enqueued for processing and that there is sufficient send space to process the work request, and wherein further work request processing is delegated to the datamover thread in response to a determination that there is no longer sufficient send space to directly send RDMA frames via at least one of the connection and the association.

* * * * *